US012568228B2

(12) United States Patent
Brändli

(10) Patent No.: US 12,568,228 B2
(45) Date of Patent: Mar. 3, 2026

(54) CIRCUITRIES AND METHODS

(71) Applicant: Sony Semiconductor Solutions Corporation, Atsugi (JP)

(72) Inventor: Christian Brändli, Stuttgart (DE)

(73) Assignee: Sony Semiconductor Solutions Corporation, Atsugi (JP)

( * ) Notice: Subject to any disclaimer, the term of this patent is extended or adjusted under 35 U.S.C. 154(b) by 32 days.

(21) Appl. No.: 18/282,542

(22) PCT Filed: Feb. 25, 2022

(86) PCT No.: PCT/EP2022/054737
§ 371 (c)(1),
(2) Date: Sep. 18, 2023

(87) PCT Pub. No.: WO2022/199977
PCT Pub. Date: Sep. 29, 2022

(65) Prior Publication Data
US 2024/0163457 A1     May 16, 2024

(30) Foreign Application Priority Data
Mar. 25, 2021    (EP) ..................................... 21165027

(51) Int. Cl.
*H04N 19/162*        (2014.01)
*G06T 9/00*          (2006.01)
(52) U.S. Cl.
CPC ........... *H04N 19/162* (2014.11); *G06T 9/002* (2013.01)

(58) Field of Classification Search
CPC .. H04N 19/162; H04N 19/146; H04N 19/172; H04N 19/176; H04N 19/20; G06T 9/002; G06T 5/60; G06N 3/045; G06N 3/082; G06N 3/063
See application file for complete search history.

(56) References Cited

U.S. PATENT DOCUMENTS

| | | | |
|---|---|---|---|
| 11,574,484 B1 * | 2/2023 | Linzer | G06T 7/521 |
| 2018/0199066 A1 | 7/2018 | Ross | |
| 2022/0059132 A1 * | 2/2022 | Sun | G06V 20/41 |
| 2022/0215727 A1 * | 7/2022 | Jeong | G08B 13/19656 |

FOREIGN PATENT DOCUMENTS

| | | | | |
|---|---|---|---|---|
| CN | 109348086 A | * | 2/2019 | H04N 5/04 |
| CN | 110677651 A | | 1/2020 | |
| CN | 110782032 A | * | 2/2020 | G06N 3/08 |

(Continued)

OTHER PUBLICATIONS

Charu C. Aggarwal, "1.6. Common Neural Architectures" In: "Neural Networks and Deep Learning", Aug. 26, 2018, pp. 37-44.

(Continued)

*Primary Examiner* — Maria E Vazquez Colon
(74) *Attorney, Agent, or Firm* — XSENSUS LLP

(57) ABSTRACT

A circuitry for video image encoding, the circuitry being configured to encode an input video image based on a first set of convolutional kernels of a first neural network convolutional layer and a second set of convolutional kernels of a second neural network convolutional layer, wherein the first set of convolutional kernels is optimized with respect to object representation and the second set of convolutional kernels is optimized with respect to photometric representation.

20 Claims, 6 Drawing Sheets

(56)                         References Cited

FOREIGN PATENT DOCUMENTS

| | | | |
|---|---|---|---|
| CN | 112651410 A * | 4/2021 | |
| WO | 2020/080782 A1 | 4/2020 | |
| WO | WO-2021001594 A1 * | 1/2021 | ............ G06N 3/045 |
| WO | WO-2021220008 A1 * | 11/2021 | ............ G06N 3/045 |
| WO | WO-2022182265 A1 * | 9/2022 | ............ H04N 19/30 |

OTHER PUBLICATIONS

Bai et al., "LSHR-Net: a hardware-friendly solution for high-resolution computational imaging using a mixed-weights neural network", arXiv:2004.13173v1 [eess.IV], Apr. 27, 2020, pp. 1-20.
Nan et al., "Research on Image Reconstruction of Compressed Sensing Based on a Multi-Feature Residual Network", MPDI, Sensors 2020, vol. 20, No. 15, Jul. 28, 2020, pp. 1-12.
Ma et al., "Image and Video Compression with Neural Networks: A Review", IEEE Transactions on Circuits and Systems for Video Technology, arXiv:1904.03567v2 [cs.CV], Apr. 10, 2019, pp. 1-16.
International Search Report and Written Opinion mailed on Jun. 20, 2022, received for PCT Application PCT/EP2022/054737, filed on Feb. 25, 2022, 11 pages.

* cited by examiner

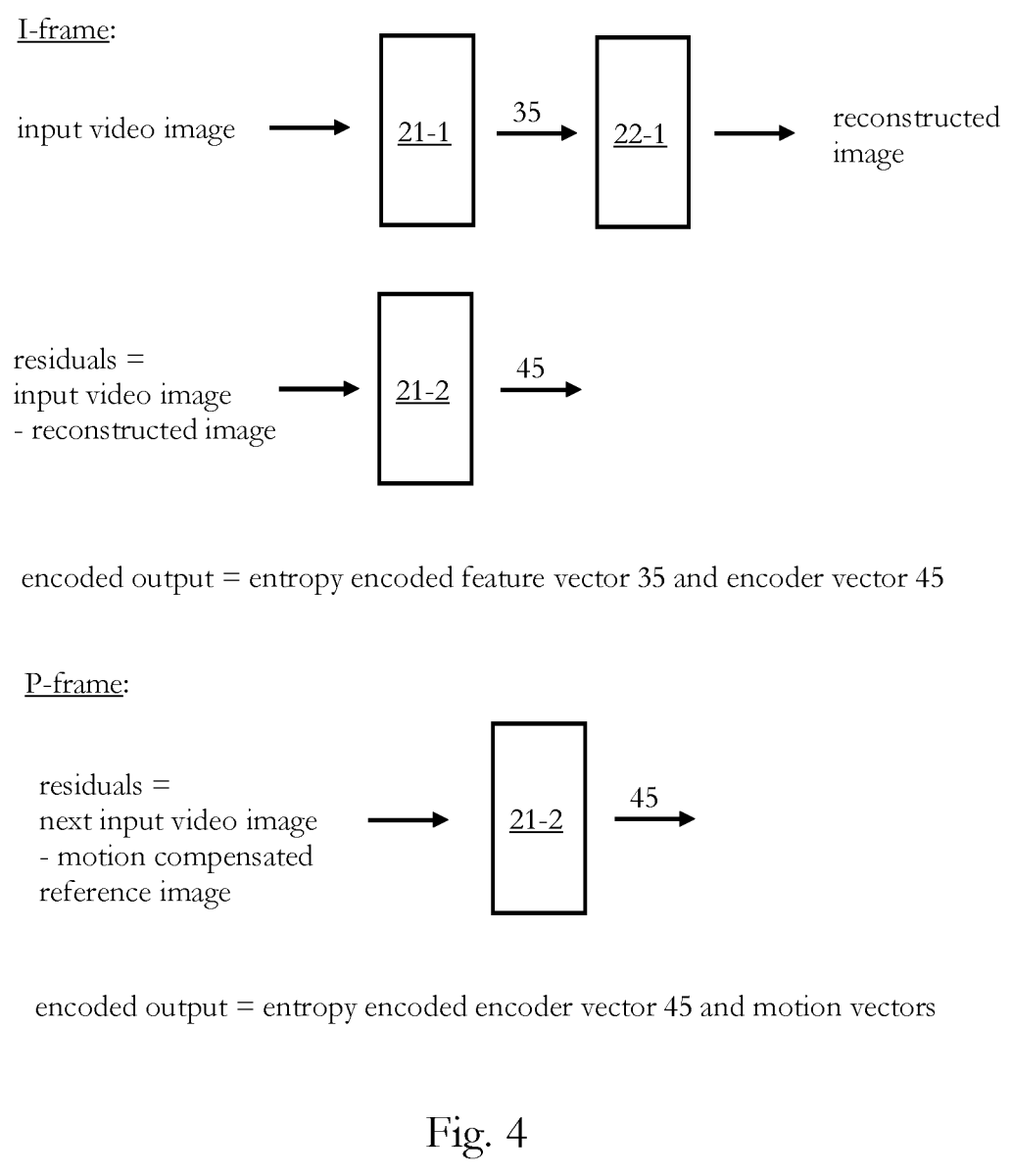

I-frame:

input video image ——▶ 21-1 ——35——▶ 22-1 ——▶ reconstructed image residuals =
input video image ——▶ 21-2 ——45——▶
- reconstructed image encoded output = entropy encoded feature vector 35 and encoder vector 45

P-frame:

residuals =
next input video image ——▶ 21-2 ——45——▶
- motion compensated
reference image encoded output = entropy encoded encoder vector 45 and motion vectors

Fig. 4

Figure 5:
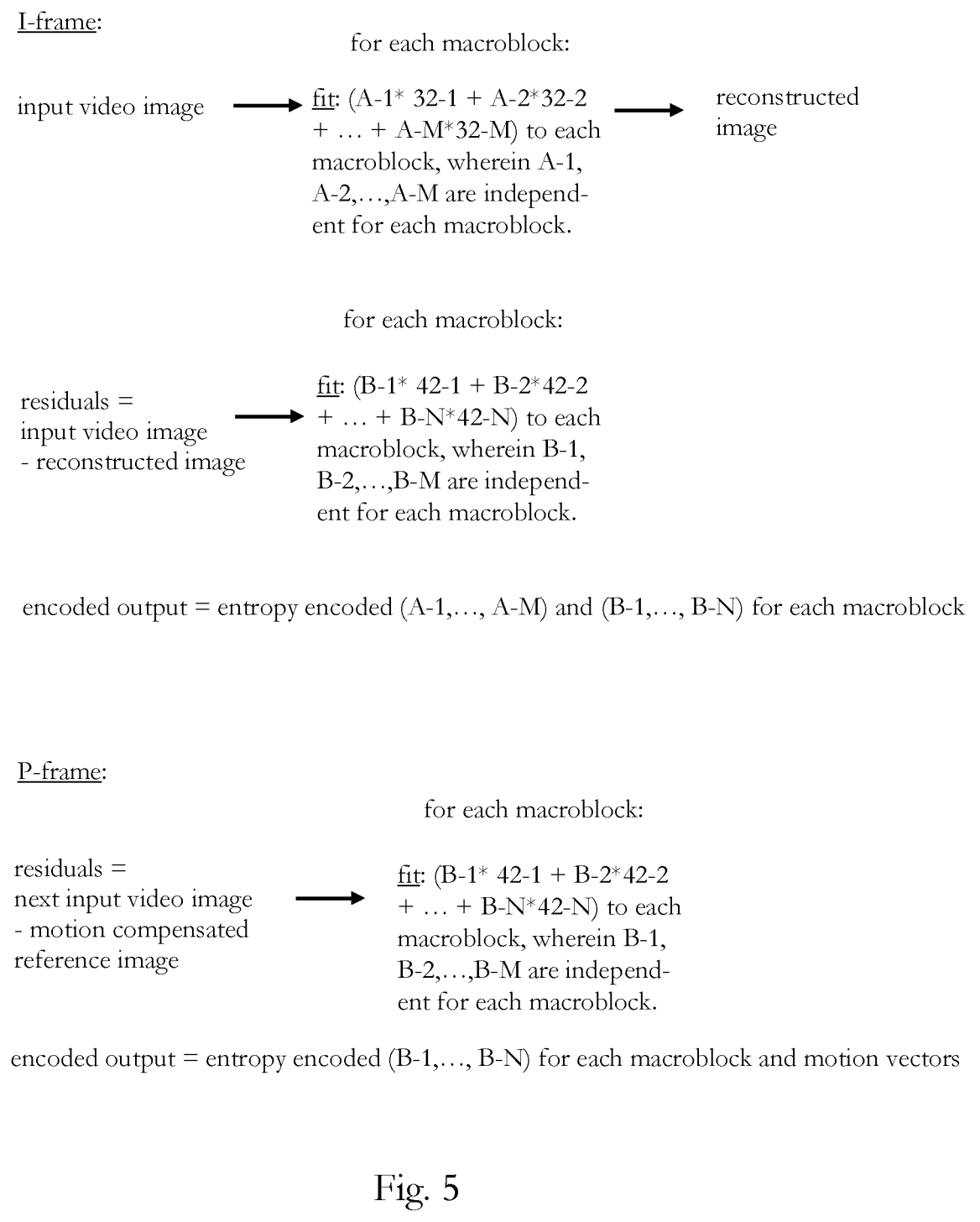

I-frame:

for each macroblock:

input video image  $\longrightarrow$  fit: (A-1* 32-1 + A-2*32-2 + ... + A-M*32-M) to each macroblock, wherein A-1, A-2,...,A-M are independent for each macroblock.  $\longrightarrow$  reconstructed image for each macroblock:

residuals = input video image - reconstructed image  $\longrightarrow$  fit: (B-1* 42-1 + B-2*42-2 + ... + B-N*42-N) to each macroblock, wherein B-1, B-2,...,B-M are independent for each macroblock.

encoded output = entropy encoded (A-1,..., A-M) and (B-1,..., B-N) for each macroblock P-frame:

for each macroblock:

residuals = next input video image - motion compensated reference image  $\longrightarrow$  fit: (B-1* 42-1 + B-2*42-2 + ... + B-N*42-N) to each macroblock, wherein B-1, B-2,...,B-M are independent for each macroblock.

encoded output = entropy encoded (B-1,..., B-N) for each macroblock and motion vectors

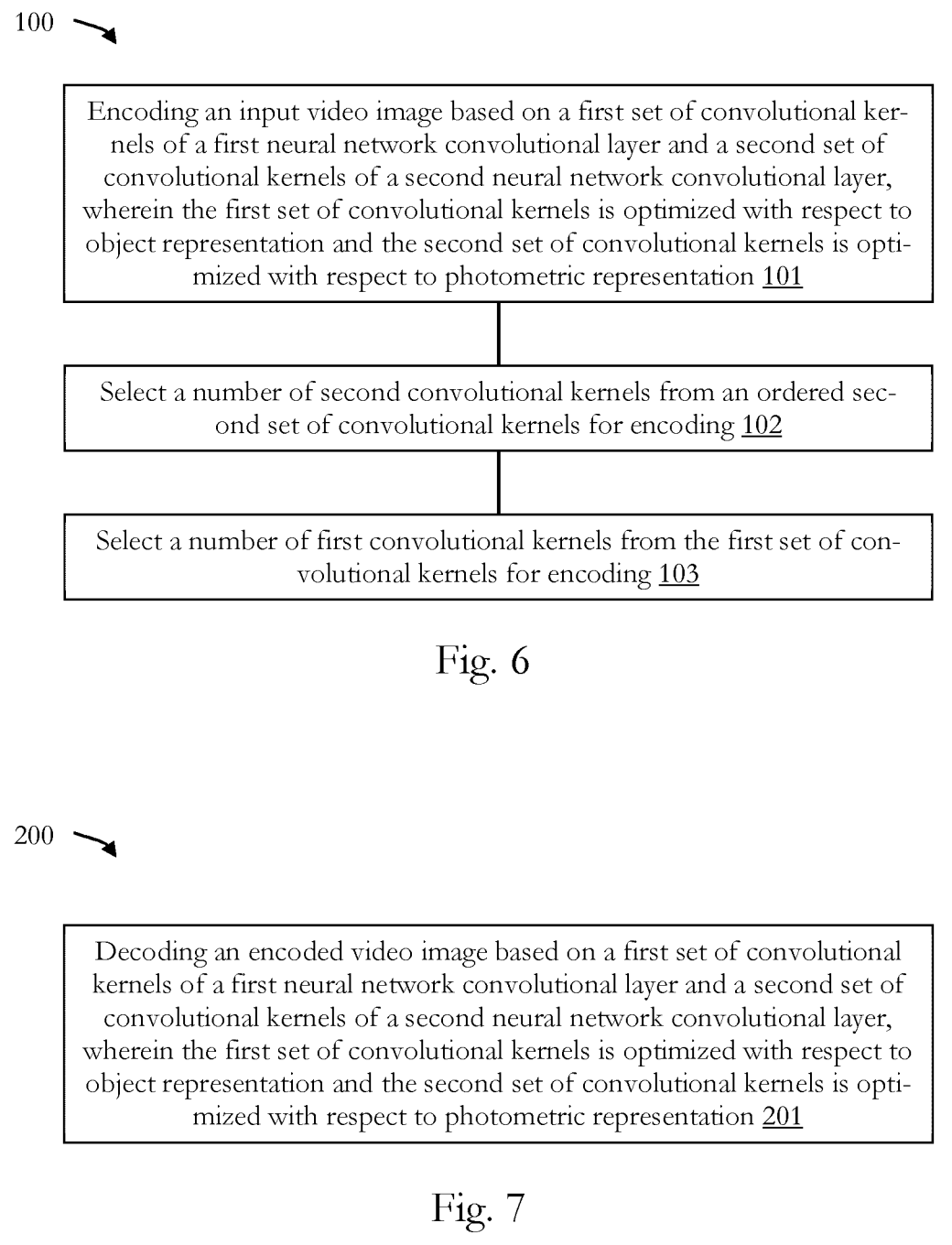

Encoding an input video image based on a first set of convolutional kernels of a first neural network convolutional layer and a second set of convolutional kernels of a second neural network convolutional layer, wherein the first set of convolutional kernels is optimized with respect to object representation and the second set of convolutional kernels is optimized with respect to photometric representation 101

Select a number of second convolutional kernels from an ordered second set of convolutional kernels for encoding 102

Select a number of first convolutional kernels from the first set of convolutional kernels for encoding 103

Decoding an encoded video image based on a first set of convolutional kernels of a first neural network convolutional layer and a second set of convolutional kernels of a second neural network convolutional layer, wherein the first set of convolutional kernels is optimized with respect to object representation and the second set of convolutional kernels is optimized with respect to photometric representation 201

Fig. 7

CIRCUITRIES AND METHODS

CROSS-REFERENCE TO RELATED APPLICATIONS

The present application is based on PCT filing PCT/EP2022/054737, filed Feb. 25, 2022, and claims priority from European Patent Application No. 21165027.0, filed Mar. 25, 2021, the entire contents of each are incorporated herein by reference.

TECHNICAL FIELD

The present disclosure generally pertains to a circuitry and a method for video image encoding and a circuitry and a method for video image decoding.

TECHNICAL BACKGROUND

Various video compression (and decompression) methods are known, in particular video image compression methods. Current video compression standards are, for example, H.264 (also known as MPEG-4/AVC ("Moving Picture Experts Group-4/Advanced Video Coding")) and H.265 (also known as HVEC ("High Efficiency Video Coding") or MPEG-H Part 2).

It is known that the information compression in such standards is based on a removal of redundancy by estimating motion in a scene and encoding the motion vectors as well as resulting residuals. Moreover, it is known to use different frame types for compression: intraframes (I-frames), predictive Frames (P-frames) and bipredictive frames (B-frames). Such intraframes basically carry information of a full image frame while the other frames carry motion information.

Typically, the intraframes and the residuals are encoded based on a discrete cosine transformation ("DCT") which identifies relevant base vectors or base images assuming that relevance is equated with inverse spatial frequency. As only DCT components are used/saved/transmitted for video image reconstruction which are most relevant for the output quality, the video image is compressed.

Although there exist techniques for video image encoding and decoding, it is generally desirable to improve the existing techniques.

SUMMARY

According to a first aspect the disclosure provides a circuitry for video image encoding, the circuitry being configured to encode an input video image based on a first set of convolutional kernels of a first neural network convolutional layer and a second set of convolutional kernels of a second neural network convolutional layer, wherein the first set of convolutional kernels is optimized with respect to object representation and the second set of convolutional kernels is optimized with respect to photometric representation.

According to a second aspect the disclosure provides a circuitry for video image decoding, the circuitry being configured to decode an encoded video image based on a first set of convolutional kernels of a first neural network convolutional layer and a second set of convolutional kernels of a second neural network convolutional layer, wherein the first set of convolutional kernels is optimized with respect to object representation and the second set of convolutional kernels is optimized with respect to photometric representation.

According to a third aspect the disclosure provides a method for video image encoding, the method comprising encoding an input video image based on a first set of convolutional kernels of a first neural network convolutional layer and a second set of convolutional kernels of a second neural network convolutional layer, wherein the first set of convolutional kernels is optimized with respect to object representation and the second set of convolutional kernels is optimized with respect to photometric representation.

According to a fourth aspect the disclosure provides a method for video image decoding, the method comprising decoding an encoded video image based on a first set of convolutional kernels of a first neural network convolutional layer and a second set of convolutional kernels of a second neural network convolutional layer, wherein the first set of convolutional kernels is optimized with respect to object representation and the second set of convolutional kernels is optimized with respect to photometric representation.

Further aspects are set forth in the dependent claims, the following description and the drawings.

BRIEF DESCRIPTION OF THE DRAWINGS

Embodiments are explained byway of example with respect to the accompanying drawings, in which:

FIG. 3 schematically illustrates in a block diagram a first embodiment of a training of sets of convolutional kernels, wherein FIG. 3A illustrates schematically in a block diagram an embodiment a training of a first set of convolutional kernels, FIG. 3B illustrates schematically in a block diagram an embodiment of a training of a second set of convolutional kernels, and FIG. 3C illustrates schematically an embodiment of a first set of convolutional kernels and a second set of convolutional kernels;

FIG. 4 schematically illustrates in a block diagram a first embodiment of encoding an input video image based on a first set of convolutional kernels and a second set of convolutional kernels;

FIG. 5 schematically illustrates in a block diagram a second embodiment of encoding an input video image based on a first set of convolutional kernels and a second set of convolutional kernels;

FIG. 6 schematically illustrates in a flow diagram an embodiment of a method for video image encoding; and FIG. 7 schematically illustrates in a flow diagram an embodiment of a method for video image decoding.

DETAILED DESCRIPTION OF EMBODIMENTS

Figure 3:
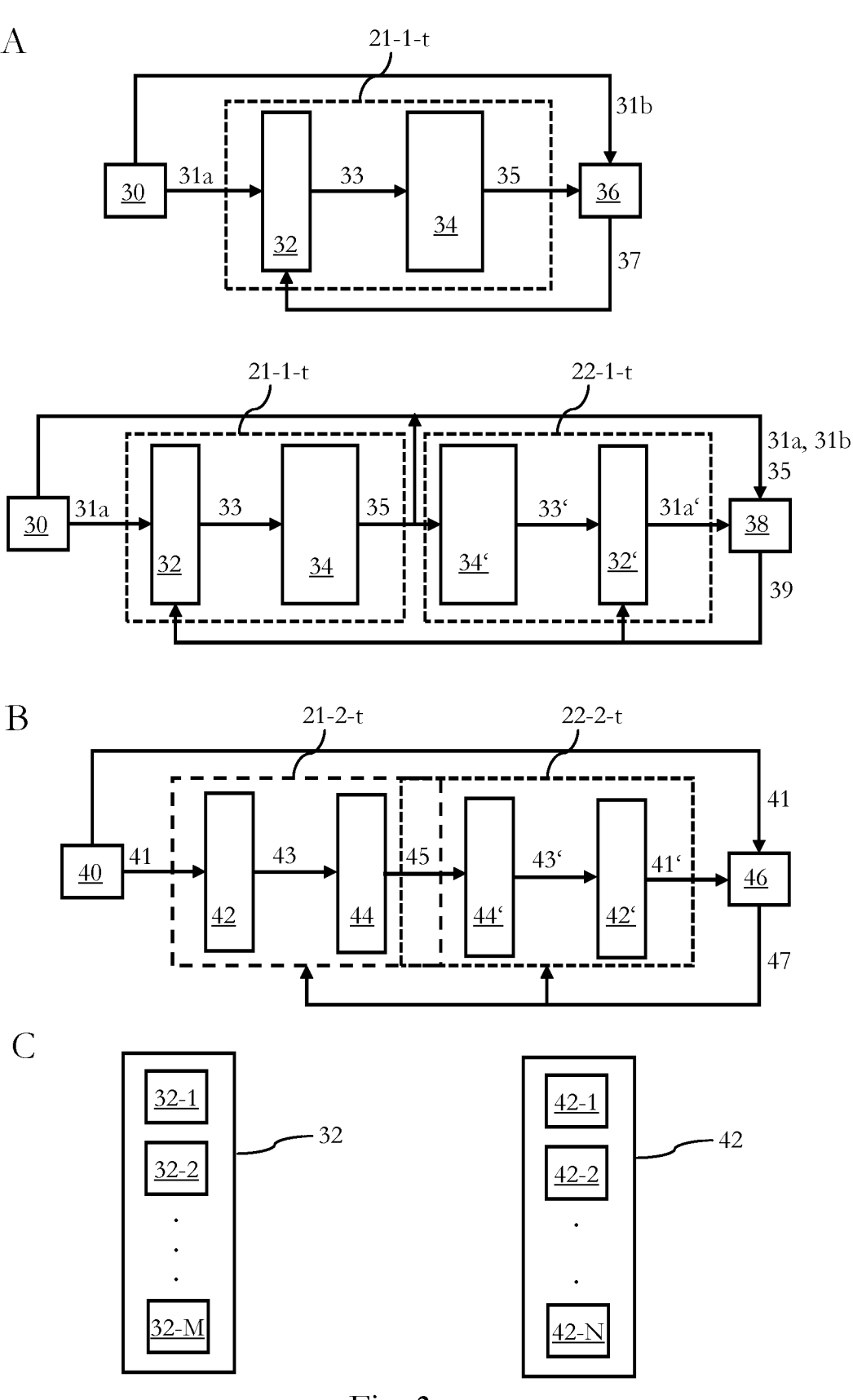

Before a detailed description of the embodiments under reference of FIG. 3 is given, general explanations are made.

As mentioned in the outset, video compression standards such as H.264 and H.265 are known, where the information compression is based on a removal of redundancy by estimating motion in a scene and encoding the motion vectors as well as resulting residuals. Moreover, it is known to use different frame types for compression: intraframes (I-frames), predictive Frames (P-frames) and bipredictive frames (B-frames). Such intraframes basically carry information of a full image frame while interframes (P- and B-frames) carry motion information.

As further mentioned in the outset, typically, the intraframes and the residuals are encoded based on a discrete cosine transformation ("DCT") which identifies relevant base vectors or base images assuming that relevance is equated with inverse spatial frequency. As only DCT components are used/saved/transmitted for video image reconstruction which are most relevant for the output quality, the video image is compressed.

For enhancing the general understanding of the present disclosure, an embodiment of a known video codec 2 is discussed under reference of FIG. 1 in the following.

An imaging unit 1 (e.g., a camera module) generates video images and the video images are input to the video codec 2.

The video codec 2 includes a coder control unit 3, a mode decision unit 4, an encoding unit 5, an entropy encoding unit 6, a decoding unit 7, a deblocking filter unit 8, a frame buffer unit 9 and a motion estimation unit 10.

The coder control unit 3 controls the mode decision unit 4, the encoding unit 5, the entropy coding unit 6 and the motion estimation unit 10 by control data which indicates, for instance, switching between intraframe and interframes, macroblock size and prefix(-free) codes.

For illustration, at first, an input video image is assigned as an intraframe, then the input video image is obtained by the encoding unit 5.

The encoding unit 5 generates for each macroblock (e.g., 4×4 pixel blocks, 8×8 pixel blocks or 16×16 pixel blocks, etc.), based on the input video image, DCT components which are then quantized with a quantization matrix such that DCT components with lower spatial frequency have a higher quantization (more states) than DCT components with higher spatial frequency. The encoding unit 5 outputs the relevant (e.g., based on thresholds) quantized DCT components which are then entropy encoded (Hoffman coding and RLE ("Run-length") encoding) by the entropy encoding unit 6 and output (e.g., to a storage or to a communication interface for transmission to a device which streams the video) as an encoded intraframe. Moreover, the encoded intraframe is decoded and dequantized by the decoding unit 7.

The deblocking filter unit 8 obtains the encoded intraframe and performs, e.g., smoothing of edges for improving motion estimation.

The frame buffer unit 9 obtains the smoothed encoded intraframe and stores it as a reference (I-)frame. Additionally, it stores further frames in the following for motion estimation.

Then, the next video image is input and assigned as a P-interframe.

The motion estimation unit 10 obtains the next input video image and estimates motion vectors for each macroblock by comparing the stored reference frame with the next input video image.

The motion estimation unit 10 outputs a motion compensated reference frame to the mode decision unit 4 and outputs the motion vectors to the entropy encoding unit 6.

The mode decision unit 4 indicates that the motion compensated reference frame is to be subtracted from the next input video image for obtaining residuals (a residual image) between the next input video image and the motion compensated reference frame.

The encoding unit 5 generates DCT components for each macroblock of the residual image as described above. Then, the encoding unit 5 outputs quantized DCT components of the residual image to the entropy encoding unit 6 for entropy encoding.

The entropy encoding unit 6 outputs as an encoded P-frame the quantized DCT components and the motion vectors.

The decoding unit 7 decodes and dequantizes the quantized DCT components to obtain a local reference P-frame which is held in the frame buffer unit 9.

An encoded B-frame can be obtained from reference I-frames and reference P-frames stored in the frame buffer unit 9 by estimating bidirectional motion vectors from forward motion estimation (e.g., with respect to a reference I-frame) and backward motion (e.g., with respect to a reference P-frame) when the B-frame is an input video image between the I-frame and the P-frame.

Hence, as discussed above, the compression is based on DCT components which order the visual content according to spatial frequencies.

It has been recognized that such an ordering may not be optimized for specific input statistics. In other words, it may not be optimized for specific imaging environments, specific objects and specific applications.

Hence, some embodiments pertain to a circuitry for video image encoding, wherein the circuitry is configured to encode an input video image based on a first set of convolutional kernels of a first neural network convolutional layer and a second set of convolutional kernels of a second neural network convolutional layer, wherein the first set of convolutional kernels is optimized with respect to object representation and the second set of convolutional kernels is optimized with respect to photometric representation.

Correspondingly, some embodiments pertain to a circuitry for video image decoding, the circuitry being configured to decode an encoded video image based on a first set of convolutional kernels of a first neural network convolutional layer and a second set of convolutional kernels of a second neural network convolutional layer, wherein the first set of convolutional kernels is optimized with respect to object representation and the second set of convolutional kernels is optimized with respect to photometric representation.

If not stated otherwise, the following general explanations pertain to both the circuitry for video image encoding and the circuitry for video image decoding.

The circuitry may be based on or may include or may be implemented by typical electronic components configured to achieve the functionality as described herein. The circuitry may be embedded in an imaging unit generating the input video image.

The circuitry may be based on or may include or may be implemented as integrated circuitry logic and the functionality may be implemented by software executed by a processor or the like. The circuitry may be based on or may include or may be implemented by a CPU (central processing unit), a microcontroller, an FPGA (field programmable gate array), an ASIC (application specific integrated circuit) or the like.

The circuitry may be based on or may include or may be implemented in parts by typical electronic components and integrated circuitry logic and in parts by software.

The circuitry may include storage capabilities such as magnetic storage, semiconductor storage, etc. The circuitry may include a data bus for transmitting and receiving data and may implement corresponding communication protocols.

Encoding an input video image may include generation of a video image representation which allows reconstructing an approximation of the input video image. The video image representation may include or may be based on one or more vectors or matrices or the like and may include quantized values such that, in some embodiments, encoding as described herein is substantially compatible with an existing video encoding/decoding standard as exemplarily and schematically discussed under reference of FIG. 1 above. Typically, in some embodiments, a data amount of the video image representation is less than a data amount of the input video image itself, thereby (lossy) video compression/decompression may be performed/achieved.

Thus, decoding of an encoded video image may include reconstructing an approximation of the input video image based on the video image representation.

The first set of convolutional kernels of a first neural network convolutional layer are convolutional kernels of at least one convolutional layer of a convolutional neural network. It is generally known that such convolutional kernels can be trained to detect common features in a plurality of images which may depend on the plurality of images on which the convolutional kernels are trained on. This may allow an application specific training.

The first set of convolutional kernels may be or include convolutional kernels of one convolutional layer or of a plurality of convolutional layers. The first set of convolutional kernels may be trained by transfer learning (as will be discussed in more detail under reference of FIG. 3). In transfer learning, as generally known, one or more layers of a neural network (such as convolutional neural network) having a plurality of layers are exchanged with the first set of convolutional kernels which are trained while the weights of other layers are kept fixed.

The first set of convolutional kernels is optimized with respect to object representation. The optimization with respect to object representation may include training the first set of convolutional kernels with respect to object detection, object feature extraction and object reconstruction. Objects may generally include things, living beings or clouds (e.g., persons, animals, trees, plants, buildings, vehicles, books, etc.) which have a shape/structure such that they can be distinguished from background which may typically low structured or unstructured such as a blue sky.

Hence, the first set of convolutional kernels is optimized to detect, extract and reconstruct features in images which are associated with objects.

The second set of convolutional kernels of a second neural network convolutional layer are or include convolutional kernels of at least one convolutional layer of a convolutional neural network.

The second set of convolutional kernels may be trained based on an autoencoder (as will be discussed in more detail under reference of FIG. 3).

The second set of convolutional kernels is optimized with respect to photometric representation. The optimization with respect to photometric representation may include training the second set of convolutional kernels with respect to gray-level detection/extraction/reconstruction, color detection/extraction/reconstruction, gray-level or color gradient detection/extraction/reconstruction, intensity distribution detection/extraction/reconstruction, gray-level and color smoothness, pixel-based optimization of gray-level and color, etc.

Hence, in other words, the first set of convolutional kernels is optimized with respect to what is in the image concerning the content and/or the semantic and the second set of convolutional kernels is optimized with respect to background reconstruction and the appearance of what is in the image (obtained and optimized by the first set of convolutional kernels).

In other words, the first set of convolutional kernels may allow a first approximated reconstruction of the input video image optimized with respect to object representation and the second set of convolutional kernels may allow an improved first approximated reconstruction of the input video image based on "what was left over" in the first approximated reconstruction of the input video image optimized with respect to photometric representation.

Hence, in some embodiments, the first set of convolutional kernels is trained based on images and the second set of convolutional kernels trained based on residuals between the reconstructions of the images and the images (as will be discussed in more detail under reference of FIG. 3).

Generally, encoding/decoding based on the first set of convolutional kernels and the second set of convolutional kernels may allow to use kernels which are trained/optimized for specific applications such as landscape videos, family videos, video conferences, automotive applications (e.g., a camera streaming a video of the environment of a car/vehicle), etc.

Hence, in some embodiments, the first set of convolutional kernels and/or the second set of convolutional kernels is application specific.

Moreover, this may further allow to weigh whether video images should be optimized with respect to object representation or with respect to photometric representation.

In some embodiments, the second set of convolutional kernels is ordered according to a photometric information content.

This may be achieved by training initially a small second set of convolutional kernels on residuals to capture a major part of photometric information content of the residuals and adding more and more kernels in the training while keeping the previous kernels fixed to capture finer details of the photometric information content of the residuals.

In some embodiments, the circuitry is further configured to select a number of second convolutional kernels from the ordered second set of convolutional kernels for encoding. In some embodiments, the circuitry is further configured to select a number of first convolutional kernels from the first set of convolutional kernels for encoding.

Thereby, the photometric representation and object representation are weighed. This may depend on a specific application or application type or a user preference.

Hence, in some embodiments, the number of second convolutional kernels in the second set of convolutional kernels is selected in accordance with a user input. In some embodiments, the number of first convolutional kernels in the first set of convolutional kernels is selected in accordance with a user input.

In some embodiments, a compression level is based on the selected number of second convolutional kernels. In some embodiments, a compression level is based on the selected number of first convolutional kernels This may take into account a smaller (less data amount) video image representation (as mentioned above, the video image representation corresponds to an input video image that was encoded based on the first and/or second set of convolutional kernels) or a video image representation which may be more efficiently compressed by subsequent entropy encoding.

In some embodiments, the first set of convolutional kernels and the second set of convolutional kernels are communicated in the beginning of a video.

The communication may be in device communication, for example, a user selects a specific video imaging mode which is associated with a specific first and second set of convolutional kernels such that the first and the second set of convolutional kernels are used in the video image encoding/decoding.

The communication may be or include a communication to an external device. For example, a user streams a specific video which is encoded with a specific first and second set of convolutional kernels such that the first and the second set of convolutional kernels is transmitted to the external device in the beginning of the video (stream).

In other embodiments, the first and the second set of convolutional kernels are standardized, for example, based on a (huge) dataset.

Some embodiments pertain to a method for video image encoding, the method including encoding an input video image based on a first set of convolutional kernels of a first neural network convolutional layer and a second set of convolutional kernels of a second neural network convolutional layer, wherein the first set of convolutional kernels is optimized with respect to object representation and the second set of convolutional kernels is optimized with respect to photometric representation.

The method may be performed by a circuitry for video image encoding as described herein.

In some embodiments, in the method, the first set of convolutional kernels and/or the second set of convolutional kernels is application specific. In some embodiments, in the method, the second set of convolutional kernels is ordered according to a photometric information content. In some embodiments, the method further includes selecting a number of second convolutional kernels from the ordered second set of convolutional kernels for encoding. In some embodiments, in the method, a compression level is based on the selected number of second convolutional kernels. In some embodiments, in the method, the number of second convolutional kernels in the second set of convolutional kernels is selected in accordance with a user input. In some embodiments, the method further includes selecting a number of first convolutional kernels from the first set of convolutional kernels for encoding. In some embodiments, in the method, the first set of convolutional kernels and the second set of convolutional kernels are communicated in the beginning of a video. In some embodiments, in the method, the first set of convolutional kernels is trained based on images and the second set of convolutional kernels is trained based on residuals between the reconstructions of the images and the images.

Some embodiments pertain to a method for video image decoding, the method including decoding an encoded video image based on a first set of convolutional kernels of a first neural network convolutional layer and a second set of convolutional kernels of a second neural network convolutional layer, wherein the first set of convolutional kernels is optimized with respect to object representation and the second set of convolutional kernels is optimized with respect to photometric representation.

The method may be performed by a circuitry for video image decoding as described herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Figure 2:
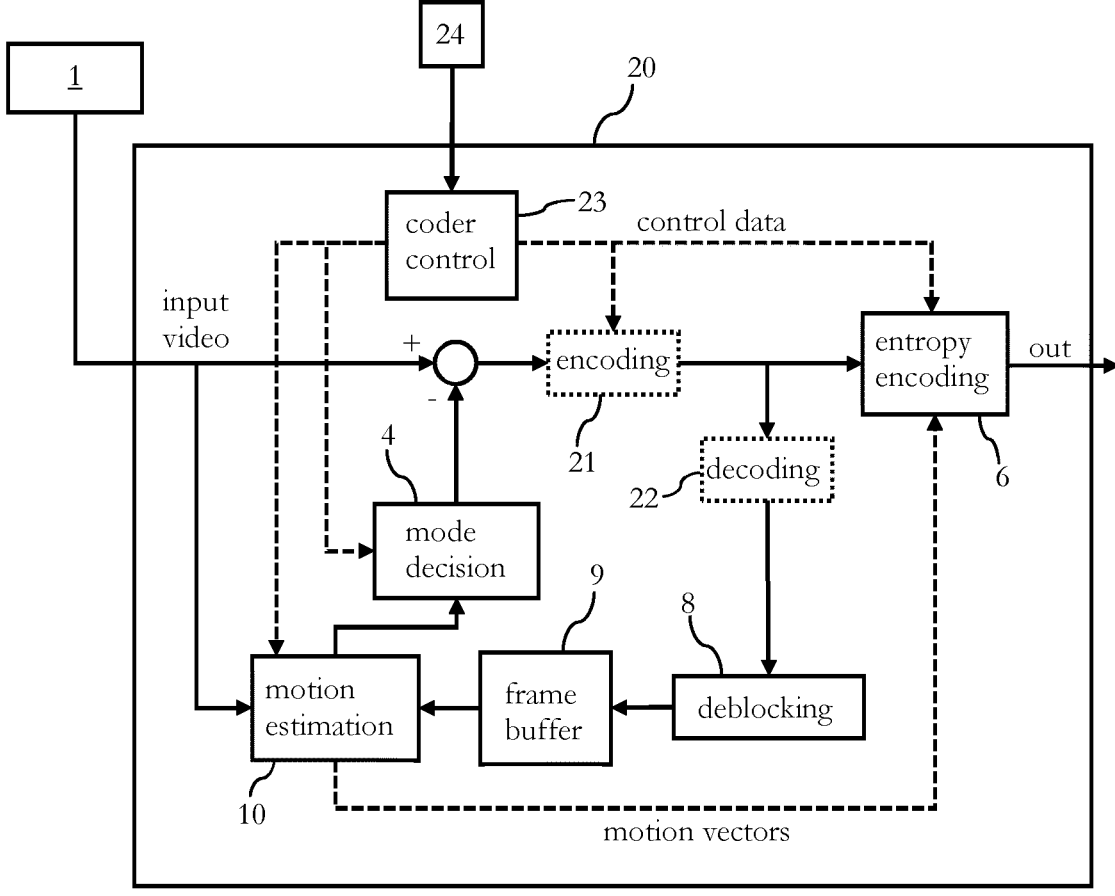
FIG. 2 schematically illustrates in a block diagram an embodiment of a video codec including an embodiment of a circuitry for video image encoding and an embodiment of a circuitry for video image decoding.

Returning to FIG. 2, there is schematically illustrated in a block diagram an embodiment of a video codec 20 including an embodiment of a circuitry 21 for video image encoding and an embodiment of a circuitry 22 for video image decoding, which is discussed in the following.

Figure 1:
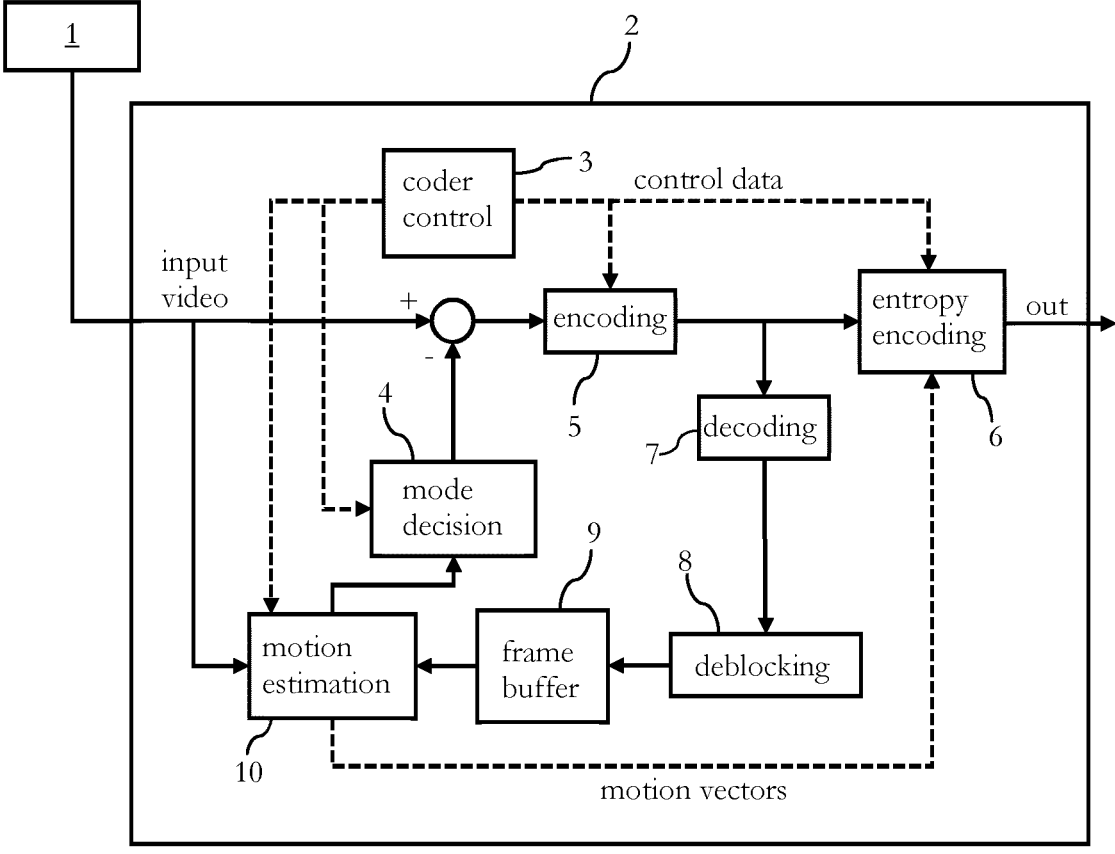
FIG. 1 schematically illustrates in a block diagram an embodiment of a known video codec.

The circuitry 21 for video image encoding basically replaces the encoding unit 5 of FIG. 1 which is based on DCT components as highlighted by the dashed box.

The circuitry 22 for video image decoding basically replaces the decoding unit 7 of FIG. 1 which is based on DCT components as highlighted by the dashed box.

Even though the circuitry 21 for video image encoding and the circuitry 22 for video image decoding are depicted as separate entities, some of the functions may overlap in some embodiments, as will be discussed under reference of FIGS. 3 to 5 below.

Further, the coder control unit 23 basically replaces the coder control unit 3 of FIG. 1 in order to account for a selection of a number of first and second convolutional kernels from the first and second set of convolutional kernels, respectively, which may be based on a user input 24.

A training of the first and second set of convolutional kernels will be described under reference of FIG. 3 below.

Two embodiments of an encoding and decoding function of the circuitries 21 and 22 will be described under reference of FIGS. 4 and 5 below.

FIG. 3 schematically illustrates in a block diagram a first embodiment of a training of sets of convolutional kernels, wherein FIG. 3A illustrates schematically in a block diagram an embodiment a training of a first set of convolutional kernels (32-1 to 32-M in FIG. 3C), FIG. 3B illustrates schematically in a block diagram an embodiment of a training of a second set of convolutional kernels (42-1 to 42-N in FIG. 3C), and FIG. 3C illustrates schematically an embodiment of a first set of convolutional kernels 32-1 to 32-M of a first neural network convolutional layer 32 and a second set of convolutional kernels 42-1 to 42-N in FIG. 3C of a second neural network convolutional layer 42.

A training of the first neural network convolutional layer 32 including the first set of convolutional kernels 32-1 to 32-M (wherein M is an Integer) is depicted in FIG. 3A, which is based on transfer learning.

The upper block diagram of FIG. 3A depicts a first encoder portion 21-1-$t$ in a training stage.

The first encoder portion 21-1-$t$ includes or is based on the first neural network convolutional layer 32 and a plurality of layers 34 of a neural network.

The plurality of layers 34 corresponds to fixed layers of a neural network which has previously been trained on a large dataset for object classification.

The first neural network convolutional layer 32 is added or replaces at least one convolutional layer of the neural network and is trained according to the following procedure. This allows to make use of existing trained neural networks for object classification which is then adapted to a specific application by the first neural network convolutional layer 32 for object representation.

A dataset 30 includes a first plurality of training images 31$a$ for a specific application (e.g., landscape video imaging) and object classification results 31$b$ for each of the first plurality of training images 31$a$. The object classification results 31$b$ includes an indication of the objects present in the respective image of the first plurality of training images 31$a$.

The first plurality of training images 31*a* is input to the first neural network convolutional layer 32 which outputs a feature map 33 for each first convolutional kernel of the first set of convolutional kernels (32-1 to 32-M).

The feature maps 33 are input to the plurality of layers 34 which outputs a feature vector 35.

Based on the feature vector 35, a loss function 36 generates an object classification estimation which is compared to the respective object classification result 31*b*.

Based on a difference between them, the loss function 36 outputs weight updates based on which the first set of convolutional kernels (32-1 to 32-M) is updated/trained for improving object classification.

Hence, based on the loss function 36, object detection and object extraction are optimized.

The lower block diagram of FIG. 3A depicts the first encoder portion 21-1-*t* and a first decoder portion 22-1-*t* in a training stage.

The first encoder portion 21-1-1 has been trained as described above.

The first decoder portion 22-1-*t* is basically the transpose of the first encoder portion 21-1-*t* including a transpose of the plurality of layers 34' and a transpose of the first neural network convolutional layer 32'. The transpose of the first neural network convolutional layer 32' also includes the first set of convolutional kernels (32-1 to 32-M).

Hence, based on the feature vector 35 output by the first encoder portion 21-1-*t*, the first decoder portion 22-1-*t* generates feature maps 33' and generates, based on the feature maps 33', a (approximated) reconstruction of the first plurality of training images 31*a'*.

Moreover, the loss function 38 obtains the object classification results 31*b* and the feature vector 35. Based on the feature vector 35, the loss function 38 generates an object classification estimation which is compared to the respective object classification result 31*b*.

Based on a difference or similarity between the (approximated) reconstruction of the first plurality of training images 31*a'* and the first plurality of training images 31*a* and based on a difference or similarity between the object classification estimation and the object classification result 31*b*, a loss function 38 outputs weight updates 39 for improving object detection, object extraction and object reconstruction.

Thus, the first set of convolutional kernels (32-1 to 32-M) is fine-tuned with respect to object representation, since object detection/extraction (classification learning) and object reconstruction (image reconstruction learning) are learned simultaneously and are weighed against each other by considering both terms in the loss function 38.

Hence, based on the loss function 38, object representation is optimized for the first set of convolutional kernels (32-1 to 32-M).

A training of the second neural network convolutional layer 42 including the second set of convolutional kernels 42-1 to 42-N(wherein N is an Integer) is depicted in FIG. 3B, which is based on training an autoencoder.

The autoencoder includes a second encoder portion 21-2-*t* and a second decoder portion 22-2-*t* in a training stage.

The second encoder portion 21-2-*t* includes the second neural network convolutional layer 42 and a fully connected layer 44.

The second decoder portion 22-2-*t* is basically the transpose of the second encoder portion 21-2-*t* including a transpose of the fully connected layer 44' and a transpose of the second neural network convolutional layer 42', wherein the transpose of the second neural network convolutional layer 42' also includes the second set of convolutional kernels (42-1 to 42-N).

A dataset 40 includes a second plurality of training images 41, wherein the second plurality of training images 41 includes the residuals between the (approximated) reconstruction of the first plurality of training images 31*a'* and the first plurality of training images 31*a* of the dataset 30 of FIG. 3A.

The second encoder portion 21-2-*t* generates an encoder vector 45 from feature maps 43 for each of the second plurality of training images 41.

The second decoder portion 22-2-*t* generates from the encoder vector 45 a (approximated) reconstruction of each of the second plurality of training images 41' based on feature maps 43'.

Based on a difference or similarity between the (approximated) reconstruction of the second plurality of training images 41' and the second plurality of training images 41, a loss function 46 outputs weight updates 47 for improving photometric representation.

The loss function 46 may measure a difference or similarity with respect to gray-level detection/extraction/reconstruction, color detection/extraction/reconstruction, gray-level or color gradient detection/extraction/reconstruction, intensity distribution detection/extraction/reconstruction, gray-level and color smoothness, pixel-based optimization of gray-level and color, or the like.

Hence, based on the loss function 46, photometric representation is optimized for the second set of convolutional kernels (42-1 to 42-N).

Once training is completed, a first encoder portion 21-1, a second encoder portion 21-2, a first decoder portion 22-1 and a second decoder portion 22-2 is obtained.

In FIG. 3C, the first set of convolutional kernels (32-1 to 32-M) of the first neural network convolutional layer 32 and the second set of convolutional kernels (42-1 to 42-N) of the second neural network convolutional layer 42 are schematically depicted in a block diagram.

The second set of convolutional kernels (42-1 to 42-N) of the second neural network convolutional layer 42 may be ordered according to photometric information content by training (according to FIG. 3B) initially a small number of second convolutional kernels which are then fixed when additional second convolutional kernels are added and trained. This may be repeated several times.

The encoding and decoding function of the circuitries 21 and 22 will be described under reference of FIGS. 4 and 5 in the following.

FIG. 4 schematically illustrates in a block diagram a first embodiment of encoding an input video image based on a first set of convolutional kernels (32-1 to 32-M) and a second set of convolutional kernels (42-1 to 42-N).

For an I-frame, an input video image is input to the first encoder portion 21-1 which generates a feature vector 35 (see for comparison FIG. 3A).

Based on the feature vector 35, the first decoder portion 22-1 generates a (approximated) reconstruction of the input video image.

A residual between the input video image and the (approximated) reconstruction of the input video image is generated which is input to the second encoder portion 21-2.

The second encoder portion 21-2 generates an encoder vector 45 (see for comparison FIG. 3B).

Then, both the feature vector 35 and the encoder vector 45 are quantized.

Thus, for an I-frame, the (quantized) feature vector 35 and the (quantized) encoder vector 45 (video image representation) are output.

Thus, an encoded I-frame/video input image, can be approximately reconstructed from the (quantized) feature vector 35 and the encoder vector 45.

Hence, the circuitry 21 for video image encoding includes the first encoder portion 21-1, the first decoder portion 22-1 and the second encoder portion 21-2.

Correspondingly, the circuitry 22 for video image decoding includes the first decoder portion 22-1 and the second decoder portion 22-2.

For a P-frame, the residual between the next input video image and a motion compensated reference image (see discussion under reference of FIG. 1) are input to the second encoder portion 21-2 which outputs an encoder vector 45.

Then, the encoder vector 45 is quantized.

Thus, for a P-frame, the (quantized) encoder vector 45 (video image representation) and the motion vectors are output. B-frames may be encoded/decoded in a similar way.

Consequently, an encoded P-frame/video input image, can be approximately reconstructed from the (quantized) encoder vector 45 (and the motion vectors).

In this embodiment, selecting a number of first and second convolutional kernels may influence a compression level, since more sparse or dense feature vectors 35 and encoder vectors 45 may be generated for better entropy encoding.

FIG. 5 schematically illustrates in a block diagram a second embodiment of encoding an input video image based on a first set of convolutional kernels (32-1 to 32-M) and a second set of convolutional kernels (42-1 to 42-N).

In this embodiment, in contrast to the previous embodiment, the circuitry 21 for video image encoding and the circuitry 22 for video image decoding do not need to have the encoder portions 21-1 and 21-2 and the decoder portions 22-1 and 22-2.

Instead, the circuitries 21 and 22 include (e.g., matrix) representations of the first set of convolutional kernels (32-1 to 32-M) of the first neural network convolutional layer 32 and the second set of convolutional kernels (42-1 to 42-N) of the second neural network convolutional layer 42.

Moreover, in this embodiment, encoding/decoding is based on macroblocks (for each macroblock) as with DCT components. Furthermore, the first convolutional kernels and the second convolutional kernels have the same size as the macroblock (e.g., 4×4 or 8×8 or the like).

The procedure discussed in the following represents an approximation to the video input image based on, e.g., least squares minimization for each macroblock.

For an I-frame, at first, each macroblock of an input video image is fitted with a linear combination of the first set of convolutional kernels (A-1*32-1+A-2*32-2+ . . . +A-M*32-M), wherein A-1, . . . , A-M are independent for each macroblock. Hence, for each macroblock, a (typically different) vector (A-1, . . . , A-M) is output (e.g., 150 (typically different) vectors if the number of macroblocks is 150).

Then, a (approximated) reconstruction of the input video image is generated from the vectors (A-1, . . . , A-M).

Afterwards, a residual between the input video image and the (approximated) reconstruction of the input video image is generated which is fitted with a linear combination of the second set of convolutional kernels (B-1*42-1+B-2*42-2+ . . . +B-N*42-N), wherein B-1, . . . , B-N are independent for each macroblock. Hence, for each macroblock, a (typically different) vector (B-1, . . . , B-N) is output (e.g., 150 (typically different) vectors if the number of macroblocks is 150). Then, both the vectors (A-1, . . . , A-M) and (B-1, . . . , B-N) are quantized and for an I-frame, the (quantized) vectors (A-1, . . . , A-M) and (B-1, . . . , B-N) are output (video image representation).

For a P-frame, the residual between the next input video image and a motion compensated reference image (see discussion under reference of FIG. 1) are fitted with a linear combination of the second set of convolutional kernels (B-1*42-1+B-2*42-2+ . . . +B-N*42-N), wherein B-1, . . . , B-N are independent for each macroblock. Hence, for each macroblock, a (typically different) vector (B-1, . . . , B-N) is output (e.g., 150 (typically different) vectors if the number of macroblocks is 150). Then, the vector (B-1, . . . , B-N) is quantized.

Thus, for a P-frame, the (quantized) vector (B-1, . . . , B-N) and the motion vectors are output (video image representation).

In this embodiment, selecting a number of first and second convolutional kernels may influence a compression level, since less/more kernels result in a lower/higher data amount as the vectors (A-1, . . . , A-M) and (B-1, . . . , B-N) are smaller/larger.

FIG. 6 schematically illustrates in a flow diagram an embodiment of a method 100 for video image encoding.

At 101, an input video image is encoded based on a first set of convolutional kernels of a first neural network convolutional layer and a second set of convolutional kernels of a second neural network convolutional layer, wherein the first set of convolutional kernels is optimized with respect to object representation and the second set of convolutional kernels is optimized with respect to photometric representation, as discussed herein.

At 102, a number of second convolutional kernels is selected from an ordered second set of convolutional kernels for encoding, as discussed herein.

At 103, a number of first convolutional kernels is selected from the first set of convolutional kernels for encoding, as discussed herein.

FIG. 7 schematically illustrates in a flow diagram an embodiment of a method 200 for video image decoding.

At 201, an encoded video image is decoded based on a first set of convolutional kernels of a first neural network convolutional layer and a second set of convolutional kernels of a second neural network convolutional layer, wherein the first set of convolutional kernels is optimized with respect to object representation and the second set of convolutional kernels is optimized with respect to photometric representation, as discussed herein.

It should be recognized that the embodiments describe methods with an exemplary ordering of method steps. The specific ordering of method steps is however given for illustrative purposes only and should not be construed as binding.

Please note that the division of the video codec 20 into units 4, 6, 8, 9, 10, 21, 22 and 23 is only made for illustration purposes and that the present disclosure is not limited to any specific division of functions in specific units. For instance, the video codec 20 could be implemented by a respective programmed processor, field programmable gate array (FPGA) and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A circuitry for video image encoding, the circuitry being configured to encode an input video image based on a first set of convolutional kernels of a first neural network convolutional layer and a second set of convolutional kernels of a second neural network convolutional layer, wherein the first set of convolutional kernels is optimized with respect to object representation and the second set of convolutional kernels is optimized with respect to photometric representation.

(2) The circuitry of (1), wherein the first set of convolutional kernels and/or the second set of convolutional kernels is application specific.

(3) The circuitry of (1) or (2), wherein the second set of convolutional kernels is ordered according to a photometric information content.

(4) The circuitry of (3), wherein the circuitry is further configured to select a number of second convolutional kernels from the ordered second set of convolutional kernels for encoding.

(5) The circuitry of (4), wherein a compression level is based on the selected number of second convolutional kernels.

(6) The circuitry of (4) or (5), wherein the number of second convolutional kernels in the second set of convolutional kernels is selected in accordance with a user input.

(7) The circuitry of anyone of (1) to (6), wherein the circuitry is further configured to select a number of first convolutional kernels from the first set of convolutional kernels for encoding.

(8) The circuitry of anyone of (1) to (7), wherein the first set of convolutional kernels and the second set of convolutional kernels are communicated in the beginning of a video and/or wherein the circuitry is embedded in an imaging unit generating the input video image.

(9) The circuitry of anyone of (1) to (8), wherein the first set of convolutional kernels is trained based on images and the second set of convolutional kernels is trained based on residuals between the reconstructions of the images and the images.

(10) A circuitry for video image decoding, the circuitry being configured to decode an encoded video image based on a first set of convolutional kernels of a first neural network convolutional layer and a second set of convolutional kernels of a second neural network convolutional layer, wherein the first set of convolutional kernels is optimized with respect to object representation and the second set of convolutional kernels is optimized with respect to photometric representation.

(11) A method for video image encoding, the method including encoding an input video image based on a first set of convolutional kernels of a first neural network convolutional layer and a second set of convolutional kernels of a second neural network convolutional layer, wherein the first set of convolutional kernels is optimized with respect to object representation and the second set of convolutional kernels is optimized with respect to photometric representation.

(12) The method of (11), wherein the first set of convolutional kernels and/or the second set of convolutional kernels is application specific.

(13) The method of (11) or (12), wherein the second set of convolutional kernels is ordered according to a photometric information content.

(14) The method of (13), further including selecting a number of second convolutional kernels from the ordered second set of convolutional kernels for encoding.

(15) The method of (14), wherein a compression level is based on the selected number of second convolutional kernels.

(16) The method of (14) or (15), wherein the number of second convolutional kernels in the second set of convolutional kernels is selected in accordance with a user input.

(17) The method of anyone of (11) to (16), further including selecting a number of first convolutional kernels from the first set of convolutional kernels for encoding.

(18) The method of anyone of (11) to (17), wherein the first set of convolutional kernels and the second set of convolutional kernels are communicated in the beginning of a video.

(19) The method of anyone of (11) to (18), wherein the first set of convolutional kernels is trained based on images and the second set of convolutional kernels is trained based on residuals between the reconstructions of the images and the images.

(20) A method for video image decoding, the method including decoding an encoded video image based on a first set of convolutional kernels of a first neural network convolutional layer and a second set of convolutional kernels of a second neural network convolutional layer, wherein the first set of convolutional kernels is optimized with respect to object representation and the second set of convolutional kernels is optimized with respect to photometric representation.

(21) A computer program comprising program code causing a computer to perform the method according to anyone of (11) to (19), when being carried out on a computer.

(22) A non-transitory computer-readable recording medium that stores therein a computer program product, which, when executed by a processor, causes the method according to anyone of (11) to (19) to be performed.

(23) A computer program comprising program code causing a computer to perform the method according to (20), when being carried out on a computer.

(24) A non-transitory computer-readable recording medium that stores therein a computer program product, which, when executed by a processor, causes the method according (20) to be performed.

The invention claimed is:

1. A circuitry for video image encoding, the circuitry being configured to encode an input video image based on a first set of convolutional kernels of a first neural network convolutional layer of a first neural network and a second set of convolutional kernels of a second neural network convolutional layer of a second neural network, wherein the first set of convolutional kernels is trained in training of the first neural network with respect to object representation and the second set of convolutional kernels is trained in training of the second neural network with respect to photometric representation, wherein the first set of convolutional kernels is trained based on input images and the second set of convolutional kernels is trained based on residuals between reconstructions of the input images and the input images.

2. The circuitry according to claim 1, wherein the first set of convolutional kernels and/or the second set of convolutional kernels is application specific.

3. The circuitry according to claim 1, wherein the second set of convolutional kernels is ordered according to a photometric information content by initially training a first subset of the second set of convolutional kernels fixed when for a plurality of times, additional second convolutional kernels are added and trained.

4. The circuitry according to claim 3, wherein the circuitry is further configured to select a number of second convolutional kernels from the ordered second set of convolutional kernels for encoding to account for a compression level.

5. The circuitry according to claim 4, wherein the compression level is based on the selected number of second convolutional kernels.

6. The circuitry according to claim 4, wherein the number of second convolutional kernels in the second set of convolutional kernels is selected in accordance with a user input.

7. The circuitry according to claim 1, wherein the circuitry is further configured to select a number of first convolutional kernels from the first set of convolutional kernels for encoding to account for a compression level.

8. The circuitry according to claim 1, wherein the first set of convolutional kernels and the second set of convolutional kernels are communicated in the beginning of a video and/or wherein the circuitry is embedded in an imaging unit generating the input video image.

9. The circuitry according to claim 1, wherein the first neural network convolutional layer is an initial convolutional layer of the first neural network.

10. A circuitry for video image decoding, the circuitry being configured to decode an encoded video image based on a first set of convolutional kernels of a first neural network convolutional layer of a first neural network and a second set of convolutional kernels of a second neural network convolutional layer of a second neural network, wherein the first set of convolutional kernels is trained in training of the first neural network with respect to object representation and the second set of convolutional kernels is trained in training of the second neural network with respect to photometric representation, wherein the first set of convolutional kernels is trained based on input images and the second set of convolutional kernels is trained based on residuals between reconstructions of the input images and the input images.

11. A method for video image encoding, the method comprising encoding an input video image based on a first set of convolutional kernels of a first neural network convolutional layer of a first neural network and a second set of convolutional kernels of a second neural network convolutional layer of a second neural network, wherein the first set of convolutional kernels is trained in training of the first neural network with respect to object representation and the second set of convolutional kernels is trained in training of the second neural network with respect to photometric representation, wherein the first set of convolutional kernels is trained based on input images and the second set of convolutional kernels is trained based on residuals between reconstructions of the input images and the input images.

12. The method according to claim 11, wherein the first set of convolutional kernels and/or the second set of convolutional kernels is application specific.

13. The method according to claim 11, wherein the second set of convolutional kernels is ordered according to a photometric information content by initially training a first subset of the second set of convolutional kernels fixed when for a plurality of times, additional second convolutional kernels are added and trained.

14. The method according to claim 13, further comprising selecting a number of second convolutional kernels from the ordered second set of convolutional kernels for encoding.

15. The method according to claim 14, wherein a compression level is based on the selected number of second convolutional kernels.

16. The method according to claim 14, wherein the number of second convolutional kernels in the second set of convolutional kernels is selected in accordance with a user input.

17. The method according to claim 11, further comprising selecting a number of first convolutional kernels from the first set of convolutional kernels for encoding to account for a compression level.

18. The method according to claim 11, wherein the first set of convolutional kernels and the second set of convolutional kernels are communicated in the beginning of a video.

19. The method according to claim 11, wherein a combination of the first set of convolutional kernels and the second set of convolutional kernels forms a reconstruction kernel set for an encoded macroblock.

20. A method for video image decoding, the method comprising decoding an encoded video image based on a first set of convolutional kernels of a first neural network convolutional layer of a first neural network and a second set of convolutional kernels of a second neural network convolutional layer of a second neural network, wherein the first set of convolutional kernels is trained in training of the first neural network with respect to object representation and the second set of convolutional kernels is trained in training of the second neural network with respect to photometric representation, wherein the first set of convolutional kernels is trained based on input images and the second set of convolutional kernels is trained based on residuals between reconstructions of the input images and the input images.

* * * * *